UNITED STATES PATENT OFFICE.

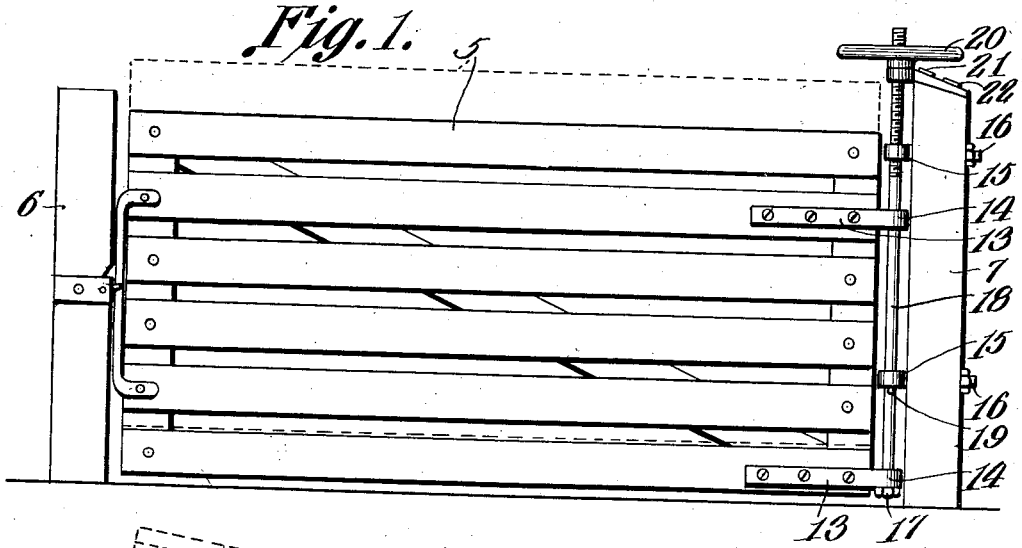

MALCOM MILLER REEDER, OF TUSCOLA, ILLINOIS.

GATE.

1,032,941.  Specification of Letters Patent.  Patented July 16, 1912.

Application filed October 27, 1911. Serial No. 657,114.

*To all whom it may concern:*

Be it known that I, MALCOM M. REEDER, a citizen of the United States, residing at Tuscola, in the county of Douglas and State of Illinois, have invented a new and useful Gate, of which the following is a specification.

This invention relates to gates, and has for its object to provide a vertically adjustable gate combining simplicity and durability of construction and ease of operation.

With the above and other objects in view this invention is embodied in the novel construction and combination of parts as hereinafter described and claimed, the invention being illustrated in the accompanying drawings, wherein similar reference characters indicate similar parts, and wherein:—

Figure 1 is a side elevation of a gate embodying the present invention. Fig. 2 is a plan view thereof on an enlarged scale, parts broken away, and the gate being shown in partial open position. Fig. 3 is an elevation similar to Fig. 1 with parts shown in section. Fig. 4 is a sectional view taken horizontally through the gate.

Referring in detail to the drawings, the gate is designated by the numeral 5, being shown as constructed of lumber in the customary manner, although it is understood that this gate may be either of the customary steel or wire construction. This gate 5 is mounted to a post 7 in a novel manner whereby the gate may be swung upon the said post to and from the post 6 and be adjusted vertically. A pair of straps 13 are secured to the end of the gate and have the eyes 14 on their outer ends. A pair of eye-bolts 16 are secured to the post 7 above the respective straps 13 and have the eyes 15 thereof alining with the eyes 14. To the upper end of the post 7 is secured a V-shaped bracket 22 having the eye 21 projecting from the crotch thereof and alining with the eyes 14 and 15. A vertical rod 18 passes through the eyes 14, 15 and 21 and, on its lower end is screw-threaded a nut 17 while, on the upper end thereof is screw-threaded a suitable hand wheel 20. The nut 17 supports the gate 5 upon the rod 18 for swinging movement thereon, and the hand wheel 20 in resting or bearing upon the eye 21 supports the rod 18.

In use, the gate may be locked in closed position in any suitable manner, not necessary to describe in detail and when the gate is free the same may be swung upon the rod 18. By turning the hand wheel 20 in the proper direction the same is caused to screw upon the rod 18, thus raising the said rod and raising the gate 5, or in a similar manner by reversing the movement of the hand wheel, the gate may be lowered. This is of a special advantage when the gate is used in connection with a fence closure on farms when it is desired to raise the gate to permit animals to pass thereinunder, it being noted that the gate may be adjusted to any height whereby only small animals may be permitted to pass thereinunder or the gate may be raised to a height for permitting larger animals to also pass thereinunder. By removing the nut 17, the rod 18 may be slid upward out of the eyes 14 and 15, thus permitting the gate to be removed when so desired or necessary and the same may be readily attached to the post 7. A key or cotter pin 19 is insertible through the rod 18 below the lower eye 15 to normally prevent the rod 18 from being raised.

A gate constructed in accordance with the present invention will be efficient and convenient in its use, and as stated above combine simplicity and durability of construction with ease of operation.

What is claimed is:—

1. The combination of a gate, a post, eyes secured to each of said parts, a vertical rod passing through the said eyes, the gate being supported by the said rod, and a hand wheel screw-threaded upon the said rod and resting on one of the eyes secured to the post to raise and lower the gate.

2. The combination of a gate, a post, straps secured to the end of the gate and having eyes in the outer ends thereof, eye-bolts secured to the post, a bracket secured to the upper end of the said post and having an eye projecting therefrom, all of the said eyes being in alinement, a vertical rod passing through the said eyes, a nut screw-threaded on the lower end of the said rod to support the gate, a hand wheel screw-threaded upon the upper end of the said rod and resting upon the last mentioned eye to raise and lower the gate.

In testimony that I claim the foregoing as my own, I have hereto affixed my signature in the presence of two witnesses.

MALCOM MILLER REEDER.

Witnesses:
    ISAAC MARTIN,
    WILLIAM RICE.

Copies of this patent may be obtained for five cents each, by addressing the "Commissioner of Patents, Washington, D. C."